US010632922B2

(12) United States Patent
Salter et al.

(10) Patent No.: US 10,632,922 B2
(45) Date of Patent: Apr. 28, 2020

(54) VEHICLE MIRROR ASSEMBLIES FOR ADDRESSING MOISTURE ACCUMULATION

(71) Applicant: FORD GLOBAL TECHNOLOGIES, LLC, Dearborn, MI (US)

(72) Inventors: Stuart C. Salter, White Lake, MI (US); Paul Kenneth Dellock, Northville, MI (US); Erick Michael Lavoie, Dearborn, MI (US); Pietro Buttolo, Dearborn Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/700,421

(22) Filed: Sep. 11, 2017

(65) Prior Publication Data

US 2019/0077316 A1 Mar. 14, 2019

(51) Int. Cl.
G02B 1/00 (2006.01)
B60R 1/06 (2006.01)
B60R 1/00 (2006.01)
B60R 1/07 (2006.01)
B60R 1/12 (2006.01)

(52) U.S. Cl.
CPC ............ B60R 1/0602 (2013.01); B60R 1/006 (2013.01); B60R 1/07 (2013.01); *B60R 2001/1223* (2013.01)

(58) Field of Classification Search
CPC ......... B60R 1/0602; B60R 1/006; B60R 1/07; B60R 2001/1223; G02B 1/00
USPC .......................................................... 359/508
See application file for complete search history.

(56) References Cited

U.S. PATENT DOCUMENTS

| 2010/0304690 | A1 | 12/2010 | Proefke et al. |
| 2012/0206930 | A1* | 8/2012 | Minikey, Jr. ......... B60Q 1/2665 362/494 |
| 2017/0259788 | A1* | 9/2017 | Villa-Real ............. B60R 1/0602 |

FOREIGN PATENT DOCUMENTS

| DE | 3105206 A1 | 9/1982 |
| DE | 102006027937 A1 | 2/2008 |
| JP | 2005297868 A | 10/2005 |
| JP | 2014205461 A | 10/2014 |
| KR | 20010103877 A | 11/2001 |
| KR | 20140016018 A | 2/2014 |

OTHER PUBLICATIONS

Volvo Cars Support, Power door mirrors—automatic tilting/retraction; http://support.volvocars.com/en-ca/cars/pages/owners-manual.aspx?mc=Y413&my=2015&sw=14w46&article=ae2c4f8fb94ef07fc0a801e8014ad813.
2017 Nissan Murano—Outside Mirror Adjustments; https://www.youtube.com/watch?v=XomBx1aVgbc.

* cited by examiner

*Primary Examiner* — Euncha P Cherry
(74) *Attorney, Agent, or Firm* — Carlson, Gaskey & Olds

(57) ABSTRACT

This disclosure details vehicle systems and methods for controlling vehicle exterior mirror assemblies to reduce moisture accumulation on exposed surfaces of the mirror assemblies. An exemplary vehicle system includes a mirror assembly, a sensor system configured to detect moisture on a vehicle surface, and a control module configured to automatically command a mirror of the mirror assembly to a tilted position in response to detecting the moisture on the vehicle surface.

25 Claims, 5 Drawing Sheets

VEHICLE MIRROR ASSEMBLIES FOR ADDRESSING MOISTURE ACCUMULATION

TECHNICAL FIELD

This disclosure relates to vehicle systems and associated methods for controlling vehicle mirror assemblies to reduce the accumulation of moisture or other debris on exposed surfaces of the mirror assemblies.

BACKGROUND

Vehicle exterior mirror assemblies provide reflective surfaces that allow a vehicle operator to visualize on-coming traffic approaching from the rear of the vehicle. Some vehicle mirror assemblies are located on external portions of the vehicle and are therefore susceptible to the buildup of moisture (e.g., rain, snow, and ice) or other debris (e.g., dirt) that may reduce the visibility of the vehicle operator.

SUMMARY

A vehicle system according to an exemplary aspect of the present disclosure includes, among other things, a mirror assembly, a sensor system configured to detect moisture on a vehicle surface, and a control module configured to automatically command a mirror of the mirror assembly to a tilted position in response to detecting the moisture on the vehicle surface.

In a further non-limiting embodiment of the foregoing vehicle system, the mirror assembly includes a housing, a mirror held within the housing, an actuator assembly for moving the mirror, and a heating element for heating the mirror.

In a further non-limiting embodiment of either of the foregoing vehicle systems, the actuator assembly includes an electric motor.

In a further non-limiting embodiment of any of the foregoing vehicle systems, the heating element includes an electric heating pad or a resistive heating wire.

In a further non-limiting embodiment of any of the foregoing vehicle systems, the sensor system includes at least one of a light refraction sensor or a capacitive sensor.

In a further non-limiting embodiment of any of the foregoing vehicle systems, the sensor system includes an ambient temperature sensor.

In a further non-limiting embodiment of any of the foregoing vehicle systems, the control module is configured to command heating of the mirror if an ambient temperature is below a temperature threshold.

In a further non-limiting embodiment of any of the foregoing vehicle systems, the control module is configured to command vibrating of the mirror if a user is detected within a predefined range of the mirror assembly.

In a further non-limiting embodiment of any of the foregoing vehicle systems, a tracking system is configured to track a location of a key fob or personal electronic device.

In a further non-limiting embodiment of any of the foregoing vehicle systems, the control module is configured to command the mirror to a tilted forward position in response to detecting the moisture.

In a further non-limiting embodiment of any of the foregoing vehicle systems, the control module is configured to command the mirror to a tilted backward position subsequent to tilting the mirror to the tilted forward position.

In a further non-limiting embodiment of any of the foregoing vehicle systems, the control module is configured to command heating of the mirror prior to tilting the mirror to the tilted backward position, and is configured to command vibrating of the mirror after tilting the mirror to the tilted backward position.

A method according to another exemplary aspect of the present disclosure includes, among other things, monitoring a surface of a vehicle for moisture, and automatically tilting a mirror of a vehicle mirror assembly if moisture is detected on the surface.

In a further non-limiting embodiment of the foregoing method, automatically tilting the mirror includes tilting the mirror to a tilted forward position.

In a further non-limiting embodiment of either of the foregoing methods, the method includes automatically heating the mirror if an ambient temperature is below a temperature threshold and a user is detected in proximity to the vehicle.

In a further non-limiting embodiment of any of the foregoing methods, the method includes tilting the mirror a second time subsequent to heating the mirror.

In a further non-limiting embodiment of any of the foregoing methods, tilting the mirror the second time includes tilting the mirror to a tilted backward position.

In a further non-limiting embodiment of any of the foregoing methods, the method includes vibrating the mirror after tilting the mirror the second time.

In a further non-limiting embodiment of any of the foregoing methods, vibrating the mirror includes applying alternating tilt forward and tilt backward drive signals to an electric motor of the vehicle mirror assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details vehicle systems and methods for controlling vehicle exterior mirror assemblies to reduce moisture accumulation on exposed surfaces of the mirror assemblies. An exemplary vehicle system equipped with a mirror assembly includes a sensor system for detecting moisture and a control module for controlling the mirror system in response to detecting the moisture. In some embodiments, the control module commands tilting of a mirror of the mirror assembly if moisture is detected. In other embodiments, the control module may command heating and/or vibrating in combination with the tilting. These and other features of this disclosure are described in greater detail below.

Figure 1:
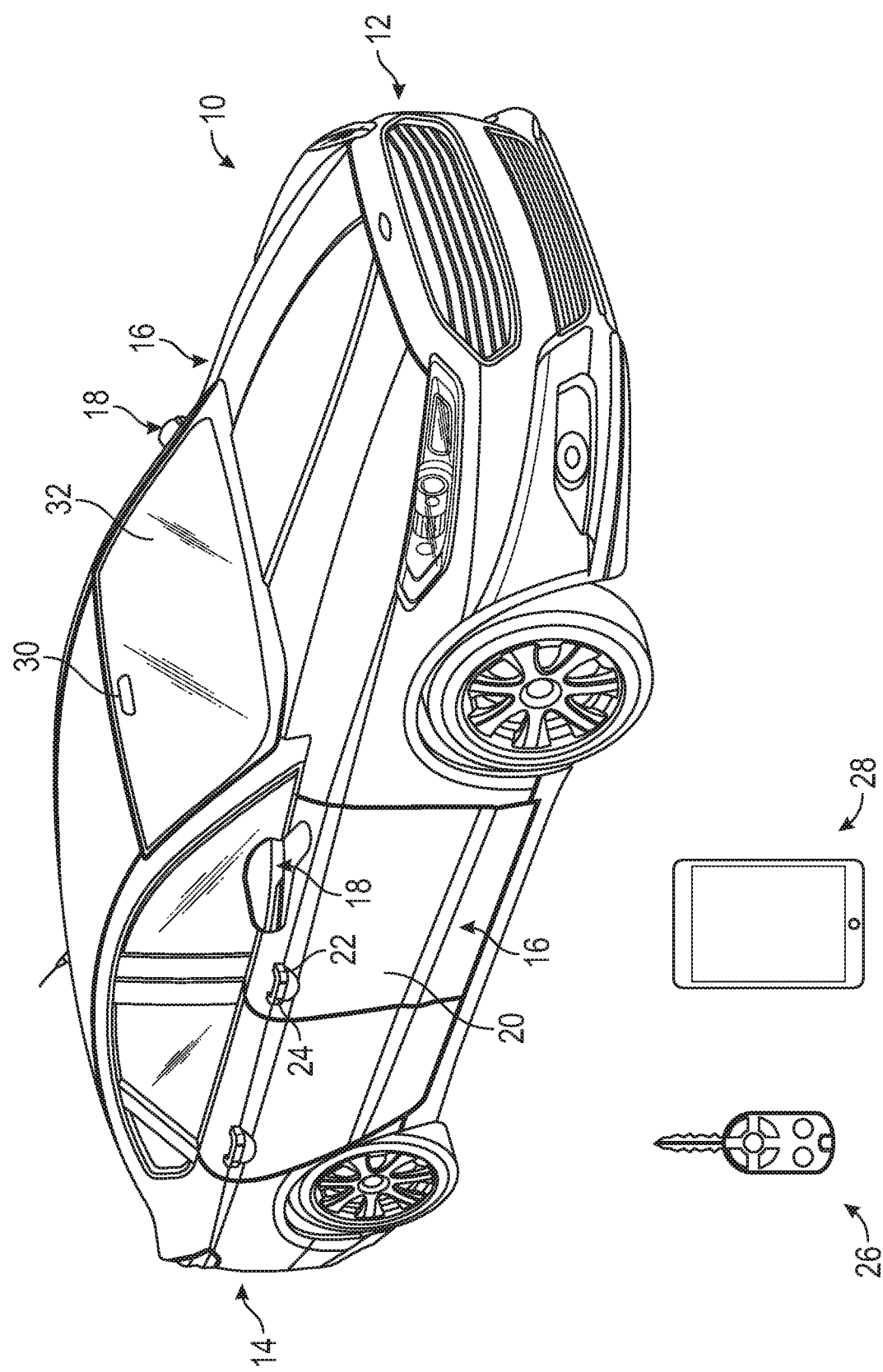
FIG. 1 illustrates a vehicle equipped with a mirror assembly.

FIG. 1 schematically illustrates a vehicle 10. The vehicle 10 may be a car, a truck, a van, a sport utility vehicle, or any other type of vehicle. The vehicle 10 could also be a conventional motor vehicle, a battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily to scale, and some features may be exaggerated or minimized to show certain details of a particular component.

The vehicle 10 includes a front portion 12, a rear portion 14, and opposing lateral sides 16 that extend between the front portion 12 and the rear portion 14. The vehicle 10 may be equipped with a pair of mirror assemblies 18 that allow a vehicle operator to visualize on-coming traffic approaching from the rear portion 14 of the vehicle 10. The mirror assemblies 18 are located at the exterior sides of the vehicle 10 and therefore may be referred to as vehicle exterior side view mirror assemblies.

In an embodiment, the mirror assemblies 18 are mounted on the opposing lateral sides 16 of the vehicle 10 and face toward the rear portion 14. In another embodiment, the mirror assemblies 18 are mounted to front passenger doors 20 of the vehicle 10. However, other mounting locations are contemplated as being within the scope of this disclosure.

The front passenger doors 20 open and close via a handle 22 equipped with a latch mechanism to permit entrance into and out of a passenger cabin of the vehicle 10. A proximity sensor 24, such as a capacitive sensor, may be installed within the handle 22 or some other location of the door 20 for sensing the hand of the user in close proximity to the handle 22. A key fob 26 or personal electronic device (e.g., phone) 28 may be operated by a user to activate various vehicle features, including but not limited to door lock and unlock functions, remote start functions, etc.

The vehicle 10 may additionally be equipped with one or more sensors 30 positioned at various locations throughout the vehicle 10 for detecting the presence of moisture (e.g., rain, snow, or ice) on exterior surfaces of the vehicle 10. For example, the sensors 30 may be positioned near a windshield 32 or other windows of the vehicle 10, or could be located within the mirror assemblies 18. In an embodiment, the sensor 30 is a light refraction sensor commonly used with automatic windshield wiper systems. In another embodiment, the proximity sensors 24 may also be capable of detecting the presence of the moisture on the handles 22 or the doors 20. The manner in which moisture is detected on surfaces of the vehicle 10 is not intended to limit this disclosure.

Once moisture has been has been detected, the mirror assemblies 18 can be automatically controlled in ways that effectively reduce the amount of moisture that is able to accumulate on the mirror assembly 18. As discussed in greater detail below, for example, the mirror assemblies 18 can be tilted, heated, and/or vibrated to reduce moisture accumulation.

Figure 2:
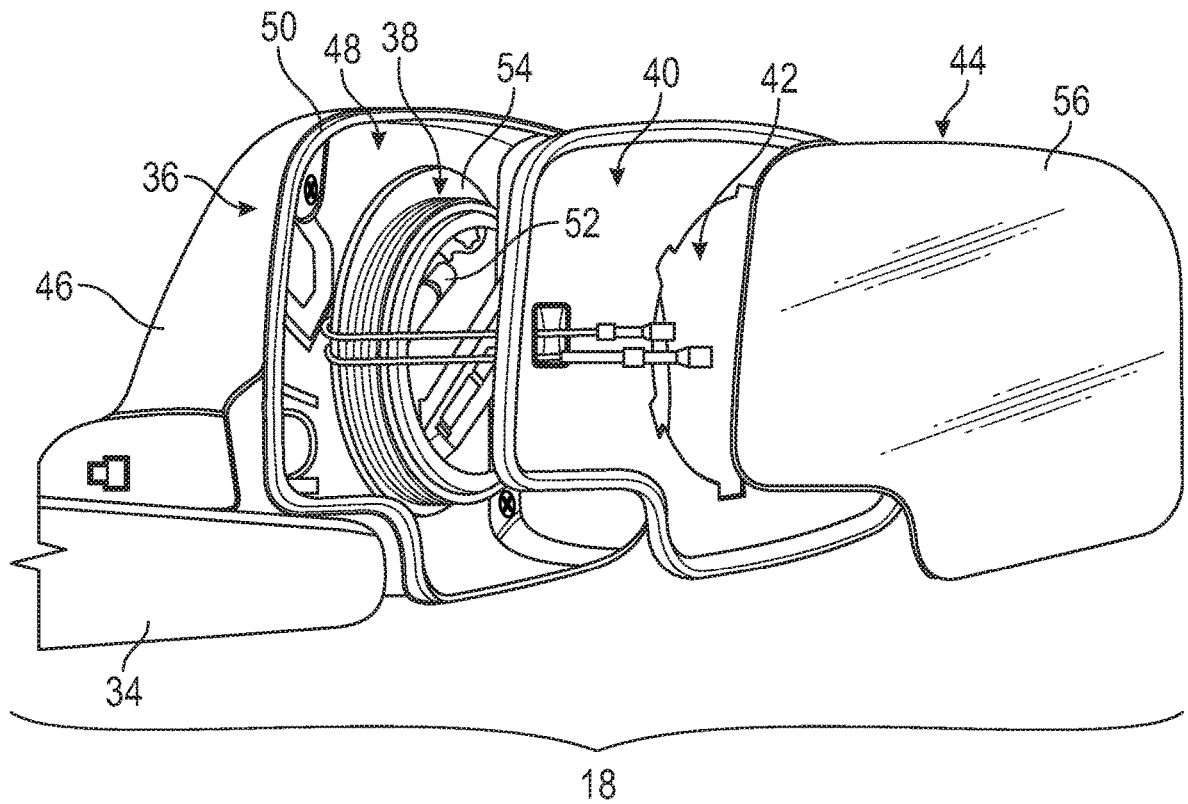
FIG. 2 is an exploded view of the mirror assembly of FIG. 1.

FIG. 2 illustrates additional details of the mirror assemblies 18 of the vehicle 10. In this embodiment, each mirror assembly 18 may include a base 34, a housing 36, an actuator assembly 38, a mirror holder 40, a heating element 42, and a mirror 44. Each of these features is described, in turn, below.

The base 34 may be affixed to the door 20 (see FIG. 1) of the vehicle 10 to mount the mirror assembly 18 relative to the door 20. In an embodiment, the base 34 is fixedly secured to the door 20 using one or more fasteners. Other fastening techniques are also contemplated within the scope of this disclosure.

The housing 36 may be a plastic structure that includes a front wall 46 and a rear facing window 48. The rear facing window 48 is circumscribed by a peripheral surface 50 that extends in surrounding relationship relative to the mirror 44.

The actuator assembly 38 is arranged and configured to move the mirror 44 between a plurality of positions (e.g., tilt forward, tilt backward, tilt left, tilt right) relative to the housing 36. In an embodiment, the actuator assembly 38 is a powered actuator assembly that includes an electric motor 52. The electric motor 52 may be energized to actuate a motion transfer mechanism 54, which in turn moves the mirror holder 40 and the mirror 44.

The mirror holder 40 is operably coupled to the actuator assembly 38 via the motion transfer mechanism 54 and movably holds the mirror 44 within the housing 36. The mirror 44 may thus be moved by pivoting or tilting the mirror holder 40. The mirror 44 includes a reflective surface 56 for aiding the vehicle driver in visualizing areas to the rear and sides of the vehicle 10.

The heating element 42 is positioned axially between the mirror 44 and the mirror holder 40 and is configured for selectively heating the mirror 44, such as during cold ambient conditions. In an embodiment, the heating element 42 is an electric heating pad. In another embodiment, the heating element 42 includes one or more resistive heating wires. Any suitably heating element 42 may be arranged within the mirror assembly 18 for selectively heating the mirror 44.

The mirror assembly 18 shown in FIG. 2 and described in the preceding paragraphs is but one example of how a mirror assembly could be configured for moving and heating the mirror 44. A person of ordinary skill in the art would understand that other mirror assembly configurations are possible for moving and heating the mirror 44. Thus, it should be appreciated that the mirror assembly arrangement of FIG. 2 is not intended to limit this disclosure.

Figure 3:
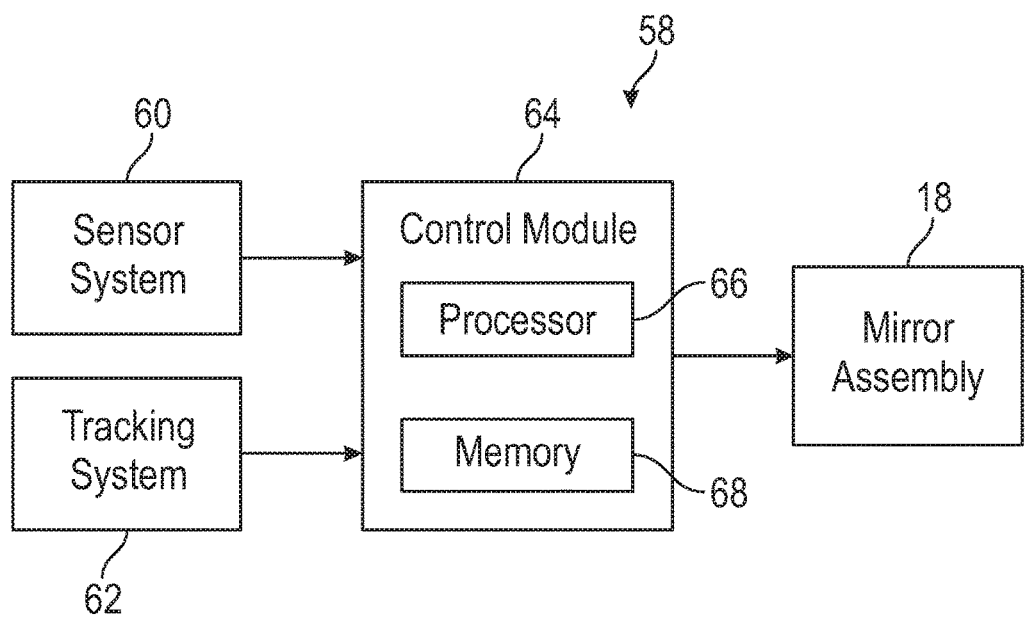
FIG. 3 is a block diagram of a vehicle system incorporating the mirror assembly shown in FIGS. 1 and 2.

FIG. 3, with continued reference to FIGS. 1-2, schematically illustrates a vehicle system 58 of the vehicle 10. The vehicle system 58 may be employed to control the mirror assembly 18 in a manner that reduces moisture accumulation on exposed surfaces of the mirror assembly 18.

In an embodiment, the vehicle system 58 includes a sensor system 60, a tracking system 62, and a control module 64. The sensor system 60 may include a plurality of sensors that provide input signals to the control module 64. In an embodiment, the sensor system 60 includes one or more moisture sensors (see, e.g., feature 30 of FIG. 1) configured to detect the presence of moisture (e.g., rain, snow, ice, etc.) on a surface of the vehicle 10. A plurality of capacitive sensors (see, e.g., feature 24 of FIG. 1) of the sensor system 60 may additionally aid in detecting the presence of moisture on the vehicle 10. In another embodiment, the sensor system 60 includes one or more ambient temperature sensors for monitoring ambient temperatures (i.e., the temperature of the surrounding environment within which the vehicle 10 is located).

The tracking system 62 is configured to track/communicate with a vehicle user. For example, the tracking system 62 may be equipped with the necessary hardware and software for tracking a location of the key fob 26 or personal electronic device 28 (see FIG. 1) of the user. The tracking methodology is not intended to limit this disclosure and could include wirelessly communicating with the key fob 26 and/or the personal electronic device 28 for detecting the proximity of an authorized vehicle user relative to the vehicle 10. In an embodiment, the tracking system 62 communicates with the key fob 26 and/or the personal electronic device 28 via radio frequency (RF) signals. In another embodiment, the tracking system 62 communicates with the key fob 26 and/or the personal electronic device 28 via Bluetooth Low Energy (BLE) signals.

The vehicle system 58 may additionally include the control module 64 for controlling each mirror assembly 18, such as by applying signals to the mirror assembly 18. In an embodiment, the control module 64 includes a processing unit 66 and non-transitory memory 68 for executing the various control strategies of the mirror assembly 18. The control module 64 may receive and process various inputs to control the mirror assembly 18 in a desired manner for reducing moisture accumulation thereon. A first input to the control module 64 may include moisture signals and ambient temperature signals from the sensor system 60. The moisture signals indicate that moisture has been detected on the vehicle 10, and the ambient temperature signals indicate the current ambient temperature of the environment surrounding the vehicle 10. A second input to the control module 64 may include a distance to user signal from the tracking system 62. The distance to user signal represents a distance that the user is detected from the vehicle 10 and indicates that the user may be approaching the vehicle 10. The distance to the user signal may be generated by computing the distance between the vehicle 10 and the key fob 26 or the personal electronic device 28 of the user, for example, and indicates whether the user is likely to enter the vehicle 10 in the immediate future.

The processing unit 66, in an embodiment, is configured to execute one or more programs stored in the memory 68 of the control module 64. A first exemplary program, when executed, may determine when and how to position the mirror 44 of the mirror assembly 18. In an embodiment, the control module 64 controls the positioning of the mirror 44, such as by tilting it, based on whether moisture has been detected on the vehicle 10.

A second exemplary program, when executed, may determine when and how to heat the mirror 44 of the mirror assembly 18. In an embodiment, the control module 64 controls heating of the mirror 44 based on whether a vehicle user is within a predefined range of the vehicle 10 and based on the ambient temperature.

A third exemplary program, when executed, may determine when and how to vibrate the mirror 44 of the mirror assembly 18. In an embodiment, the control module 64 controls vibration of the mirror 44 to shake excess moisture off the mirror 44 or to shake the mirror 44 free in a frozen situation.

Figure 4:
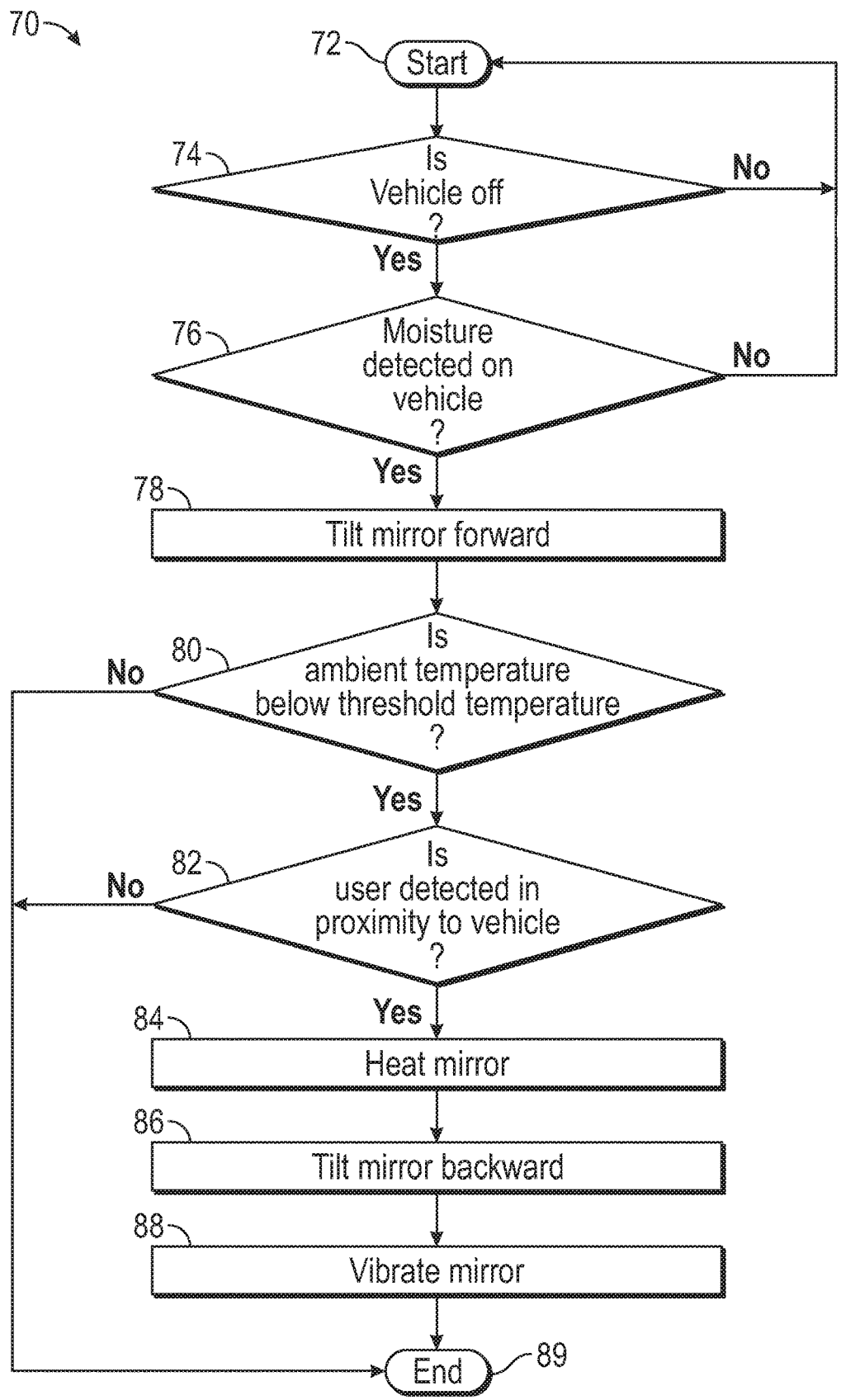
FIG. 4 schematically illustrates an exemplary method for controlling a vehicle mirror assembly to reduce moisture accumulation on the mirror.

FIG. 4, with continued reference to FIGS. 1-3, schematically illustrates a method 70 for controlling the mirror assembly 18 to reduce moisture accumulation on exterior surfaces of the mirror assembly 18. In an embodiment, the control module 64 is programmed with one or more algorithms adapted to execute the exemplary method 70.

The exemplary method 70 begins at block 72. At block 74, the control module 64 determines whether the vehicle 10 is OFF (i.e., not currently being operated). In general, the method 70 is only performed when the vehicle 10 is OFF, although some steps of the method 70 could also be performed during vehicle operation.

If the vehicle is OFF, the method 70 continues to block 76 and determines whether any moisture has been detected on the vehicle 10 at block 76. The control module 64 may analyze signals periodically received from the sensor system 60 to determine whether moisture has been detected on the vehicle 10.

Figure 5:
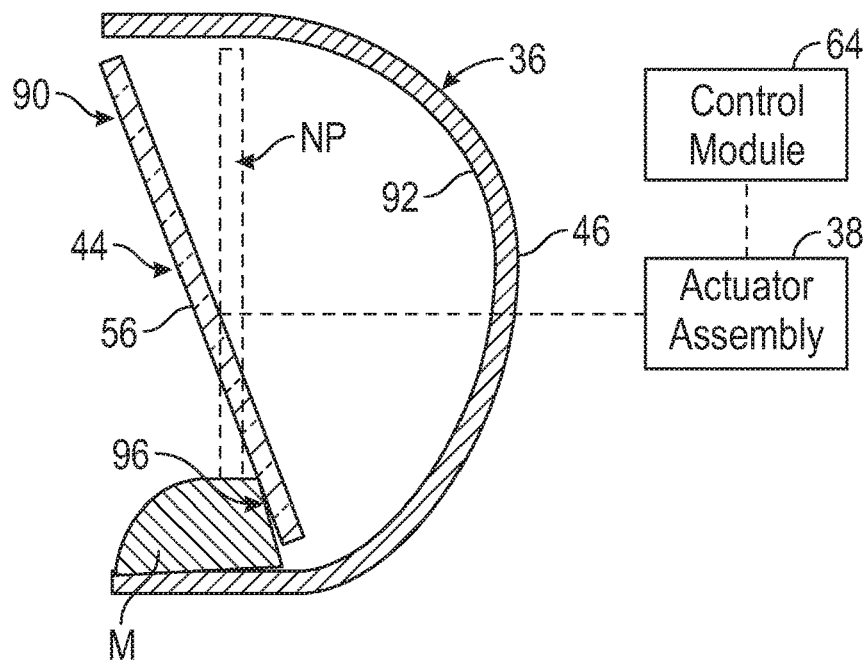
FIG. 5 schematically illustrates a tilted forward positioning of a vehicle mirror assembly.

If moisture is detected at block 76, the control module 64 automatically commands the mirror 44 to be tilted forward at block 78. The tilted forward position of the mirror 44 is schematically illustrated in FIG. 5. The control module 64 may automatically command the actuator assembly 38 to move the mirror 44 into the tilted forward position in response to detecting moisture on the vehicle 10. In the tilted forward position, the mirror is tilted from its nominal position NP such that an upper portion 90 of the mirror 44 is moved in a direction away from an inner surface 92 of the front wall 46 of the housing 36 and a bottom portion 96 of the mirror 44 is moved closer to the inner surface 92. In the tilted forward position, the reflective surface 56 of the mirror 44 is pointed more toward a ground surface and is thus less susceptible to accumulating moisture such as rain, snow, or ice.

The control module 64 may next determine whether the ambient temperature is below a predefined temperature threshold (e.g., below approximately 34° F./1° C.) at block 80. The control module 64 may analyze signals periodically received from the sensor system 60 to determine whether the ambient temperature is below a predefined temperature threshold. If YES, the control module 64 may next determine whether the vehicle user is within a predefined range of the vehicle 10 at block 82. The control module 64 may analyze signals periodically received from the tracking system 62 to determine whether the user's key fob 26 or personal electronic device 28 is detected in proximity to the vehicle 10.

Figure 6:
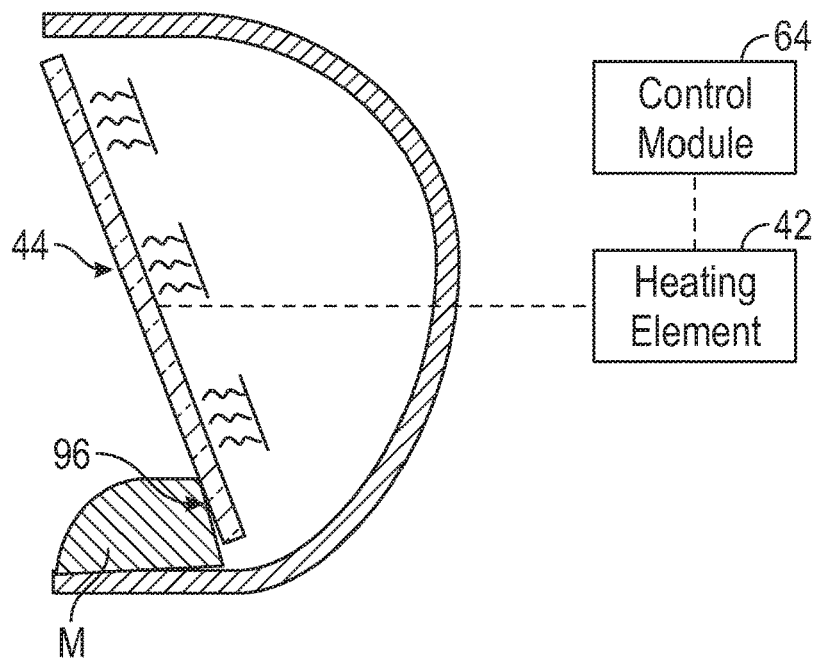
FIG. 6 schematically illustrates heating a vehicle mirror assembly.

If blocks 80 and 82 both return YES flags, the method 70 may proceed to block 84. At this step, the control module 64 may automatically command heating of the mirror 44. The heating may occur while the mirror 44 is still positioned in the tilted forward position, in an embodiment. FIG. 6 schematically illustrates the heating of the mirror 44 by actuating the heating element 42. Heating the mirror in this manner aids in loosening any moisture M that has accumulated near the bottom portion 96 of the mirror 44.

After a predefined amount of time of heating the mirror 44, the method 70 proceeds to block 86 at which time the control module 64 automatically commands the mirror 44 to be tilted backward. The tilting backward action has the effect of pushing the moisture M off of the mirror assembly 18. In an embodiment, the control module 64 automatically tilts the mirror 44 to the tilted backward position when the user has entered and started the vehicle 10.

Figure 7:
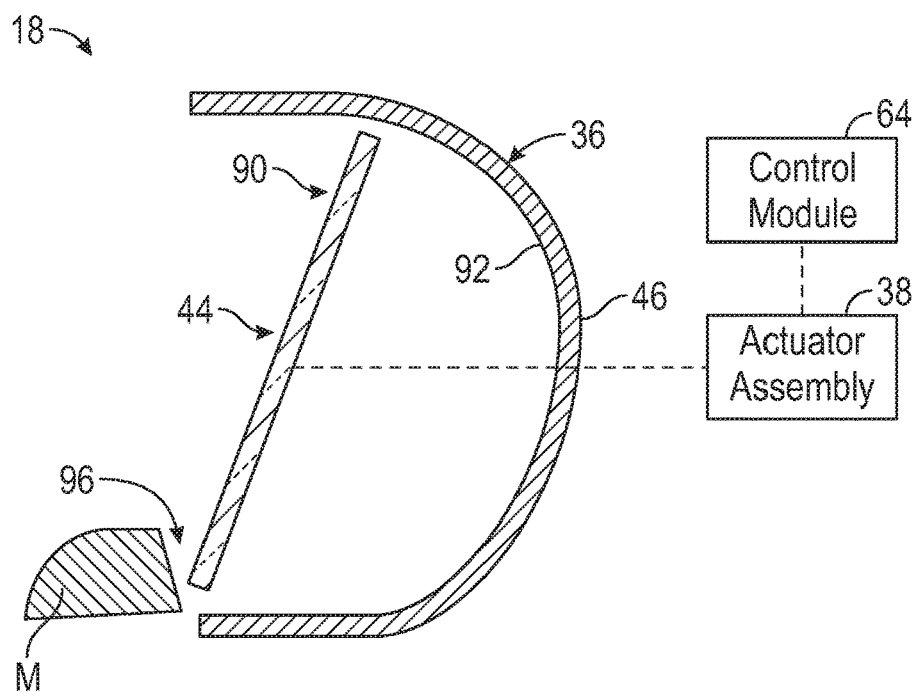
FIG. 7 schematically illustrates a tilted backward positioning of a vehicle mirror assembly.

The tilted backward position of the mirror 44 is schematically illustrated in FIG. 7. In the tilted backward position, the mirror 44 is tilted such that the upper portion 90 of the mirror 44 is moved in a direction closer toward the inner surface 92 of the front wall 46 of the housing 36 and the bottom portion 96 of the mirror 44 is moved further away from the inner surface 92.

Figure 8:
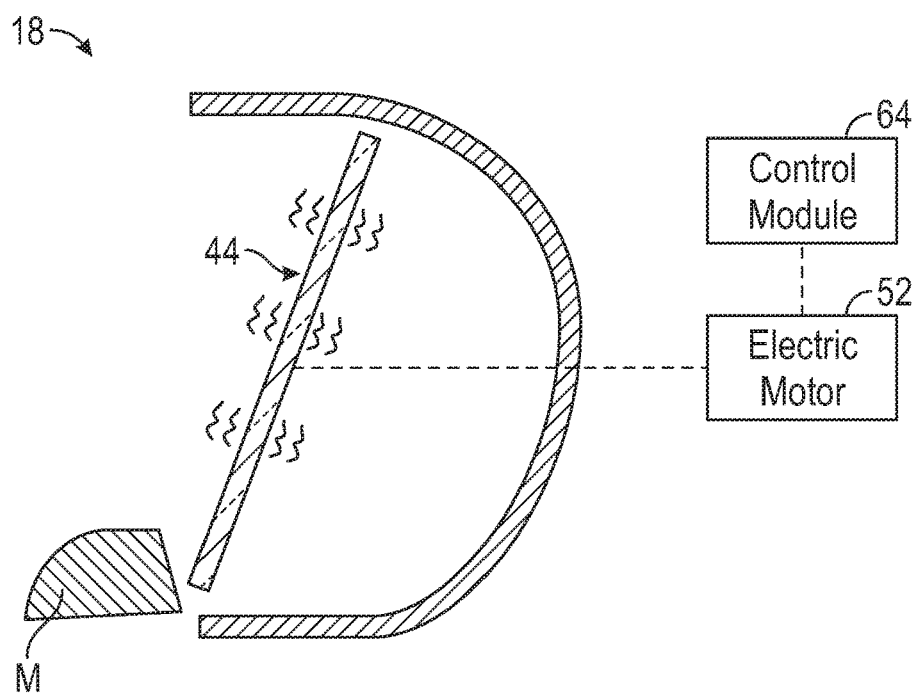
FIG. 8 schematically illustrates vibrating a vehicle mirror assembly.

After the tilt backward sequence is complete, the method 70 may proceed to block 88. At this step, the control module 64 commands vibrating of the mirror 44 in order to shake off any remaining moisture from the mirror 44. This is schematically illustrated in FIG. 8. The control module 64 may command rapid, alternating drive signals to the electric motor 52 to economically vibrate the mirror 44. In an embodiment, alternating tilt forward and tilt backward signals are sent to the electric motor 52 to cause the mirror 44 to vibrate. In another embodiment, the drive signals that are sent to the electric motor 52 are between about 10 Hz and about 60 Hz. Finally, the method 70 may end at block 89.

The vehicle mirror assemblies described herein may be controlled to provide an efficient and economical methodology for reducing moisture accumulation on the mirror assemblies. The mirror assemblies can be controlled utilizing a combination of mirror tilting, heating, and vibrating to both remove moisture that has already accumulated on the mirror and to reduce additional moisture from accumulating on the mirror.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle system, comprising:
a mirror assembly;
a sensor system configured to detect moisture on a vehicle surface; and
a control module configured to automatically command a mirror of the mirror assembly to a tilted position in response to detecting the moisture on the vehicle surface.

2. The vehicle system as recited in claim 1, wherein the mirror assembly includes a housing, a mirror held within the housing, an actuator assembly for moving the mirror, and a heating element for heating the mirror.

3. The vehicle system as recited in claim 2, wherein the actuator assembly includes an electric motor.

4. The vehicle system as recited in claim 2, wherein the heating element includes an electric heating pad or a resistive heating wire.

5. The vehicle system as recited in claim 1, wherein the sensor system includes at least one of a light refraction sensor or a capacitive sensor.

6. The vehicle system as recited in claim 1, wherein the sensor system includes an ambient temperature sensor.

7. The vehicle system as recited in claim 1, wherein the control module is configured to command heating of the mirror when an ambient temperature is below a temperature threshold.

8. The vehicle system as recited in claim 1, wherein the control module is configured to command vibrating of the mirror when a user is detected within a predefined range of the mirror assembly.

9. The vehicle system as recited in claim 1, comprising a tracking system configured to track a location of a key fob or personal electronic device.

10. The vehicle system as recited in claim 1, wherein the control module is configured to command the mirror to a tilted forward position in response to detecting the moisture.

11. The vehicle system as recited in claim 10, wherein the control module is configured to command the mirror to a tilted backward position subsequent to tilting the mirror to the tilted forward position.

12. The vehicle system as recited in claim 11, wherein the control module is configured to command heating of the mirror prior to tilting the mirror to the tilted backward position, and is configured to command vibrating of the mirror after tilting the mirror to the tilted backward position.

13. A method, comprising:
monitoring a surface of a vehicle for moisture; and
automatically tilting a mirror of a vehicle mirror assembly when moisture is detected on the surface.

14. The method as recited in claim 13, wherein automatically tilting the mirror includes tilting the mirror to a tilted forward position.

15. The method as recited in claim 13, comprising:
automatically heating the mirror when an ambient temperature is below a temperature threshold and a user is detected in proximity to the vehicle.

16. The method as recited in claim 15, comprising:
tilting the mirror a second time subsequent to heating the mirror.

17. The method as recited in claim 16, wherein tilting the mirror the second time includes tilting the mirror to a tilted backward position.

18. The method as recited in claim 16, comprising:
vibrating the mirror after tilting the mirror the second time.

19. The method as recited in claim 18, wherein vibrating the mirror includes applying alternating tilt forward and tilt backward drive signals to an electric motor of the vehicle mirror assembly.

20. The vehicle system as recited in claim 1, wherein the vehicle surface is vehicle handle or a vehicle door.

21. A vehicle system, comprising:
a mirror assembly including a mirror; and
a control module configured to (a) automatically command the mirror to a tilted position in response to detecting moisture on a vehicle surface, (b) automatically command heating of the mirror in response to an ambient temperature being below a temperature threshold, and (c) automatically command vibrating of the mirror in response to a user being detected within a predefined range of the mirror assembly.

22. The vehicle system as recited in claim 1, wherein, in the tilted position, an upper portion of the mirror is positioned at a first distance from an inner surface of a wall of a housing of the mirror assembly and a lower portion of the mirror is positioned at a second, different distance from the inner surface of the wall of the housing.

23. The vehicle system as recited in claim 22, wherein the second, different distance is a smaller distance than the first distance.

24. The vehicle system as recited in claim 10, wherein, in the tilted forward position, a reflective surface of the mirror is pointed downwardly toward a ground surface.

25. The vehicle system as recited in claim 14, wherein, in the tilted forward position, a reflective surface of the mirror is pointed downwardly toward a ground surface.

* * * * *